United States Patent [19]
Clinton

[11] 3,943,772
[45] Mar. 16, 1976

[54] CONVERTIBLE MEASURING CONTAINER
[75] Inventor: William D. Clinton, Tulsa, Okla.
[73] Assignee: Signet Controls, Inc., Tulsa, Okla.
[22] Filed: Oct. 2, 1972
[21] Appl. No.: 294,172

[52] U.S. Cl. ............................................... 73/429
[51] Int. Cl.² ......................................... G01F 19/00
[58] Field of Search ...... 73/427, 429; 220/5 R, 5 A, 220/81

[56] References Cited
UNITED STATES PATENTS

| | | | |
|---|---|---|---|
| 575,020 | 1/1897 | Atteberry | 73/429 |
| 1,277,760 | 9/1918 | Seraphin | 73/427 |
| 1,366,955 | 2/1921 | Schneible | 220/5 A |
| 1,706,336 | 3/1929 | Whitney | 73/427 |
| 2,685,964 | 8/1954 | Brown | 220/5 R |

Primary Examiner—Richard C. Queisser
Assistant Examiner—Denis E. Corr
Attorney, Agent, or Firm—Head, Johnson & Chafin

[57] ABSTRACT

This invention describes a convertible measuring container that comprises three parts; an upper part, a bottom part, both of which can be removably joined and sealed to a central cylindrical part, all three parts being of the same internal diameter. A sight glass is provided for accurately reading the surface level of the liquid in the container. By making a plurality of interchangeable central cylindrical parts, all of which have the same sealing means, the volume of the container can be changed, at will, from any one to another of a selected number of different volumes.

6 Claims, 5 Drawing Figures

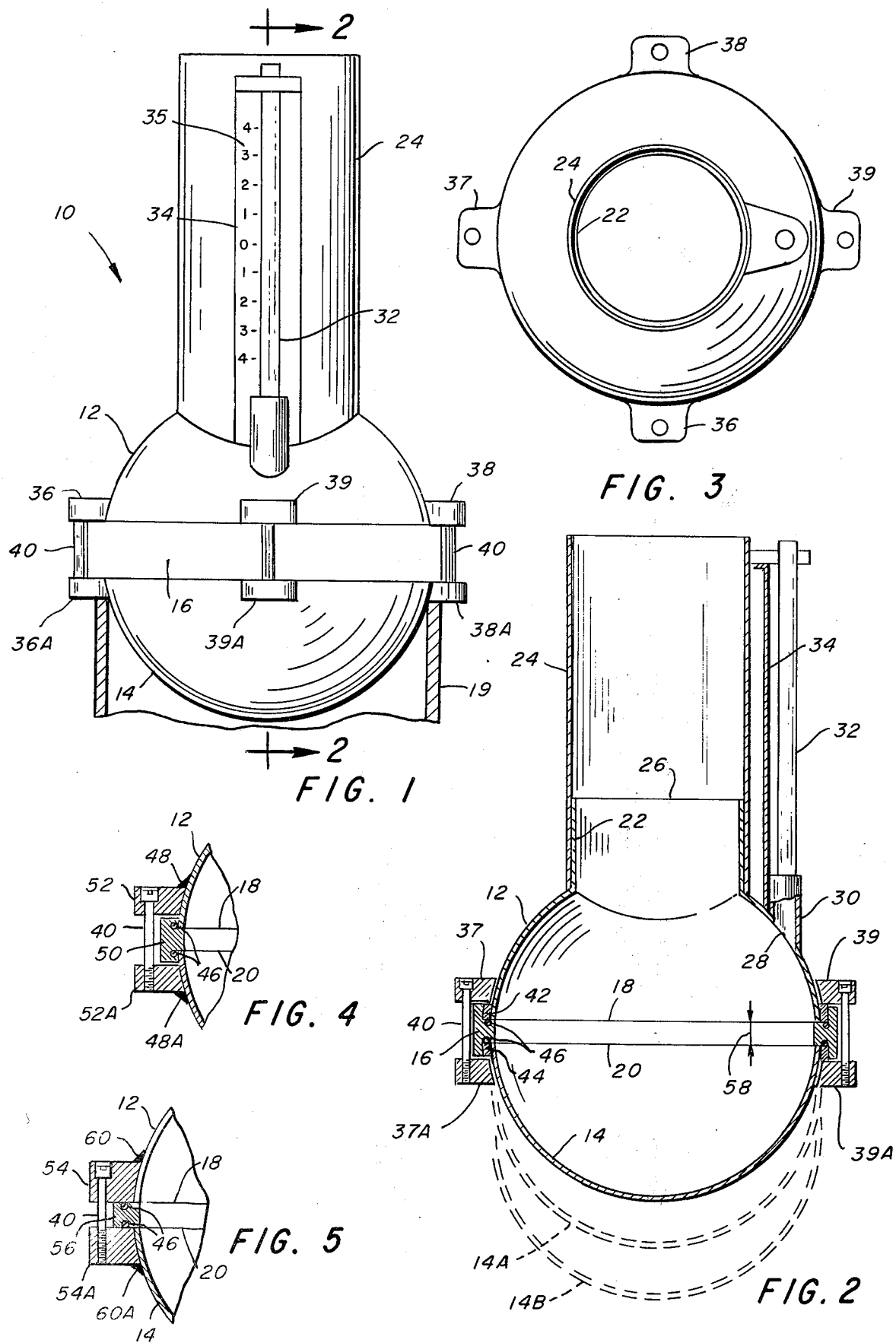

CONVERTIBLE MEASURING CONTAINER

BACKGROUND OF THE INVENTION

This invention lies in the field of volumetric measurement of liquids. More particularly, it is concerned with the design of a type of volumetric standard for use in the measurement of liquids which can be simply and rapidly assembled for different precise volumes.

In the testing of meters or other fluid measuring devices a standard volume is often required. In the prior art this has customarily been done by providing a variety of containers of different sizes which have been manufactured and calibrated for specific volumes. Thus, to satisfy the overall needs of a calibrating organization, a large number of different size containers is required, as for instance, in converting from U.S. volumetric units (gallons, etc.) to metric units (liters, etc.).

SUMMARY OF THE INVENTION

It is a principal object of this invention to provide a design of a precise volumetric measuring container which can be adjusted in volume by simply and rapidly inserting a different central part to a three-part container, so that the top and bottom parts can be used with a variety of intermediate central parts to cover a wide range of different volumes.

This and other objects are realized and the limitations of the prior art are overcome in this invention by constructing the container out of at least three parts; a top part, an intermediate central part, and a bottom part. The top and bottom parts are made of rigid metal and are generally in a hemispherical or a conical shape to provide greater stiffness and rigidity, and to minimize denting, which might alter the internal volume.

The top and bottom parts are designed to be fitted to different central cylindrical parts, of the same internal diameter, but of different axial length. Thus by changing the length of the central part, a container of different volume can be provided. Simple and convenient means are provided for attaching and sealing the top and bottom parts separately to the central part.

BRIEF DESCRIPTION OF THE DRAWINGS

A better understanding of the principles and details of the invention will be evident from the following description, taken in conjunction with the appended drawings, in which:

FIGS. 1 and 3 represent a side elevation and top view of the container of this invention.

FIG. 2 is a vertical cross section, taken through one embodiment of this invention.

FIGS. 4 and 5 illustrate alternate methods of sealing the top and bottom parts to the central part.

DESCRIPTION OF THE PREFERRED EMBODIMENT

Referring now to the drawings, and in particular to FIGS. 1, 2 and 3, these represent different views of a preferred embodiment of this invention. The overall container is identified by the numeral 10. The container comprises a minimum of three parts, namely, an upper part or housing indicated by numeral 12, a lower part or housing 14 and an intermediate or central cylindrical part or housing 16. All three parts have the same internal diameter so that when they are clamped together and sealed at their joints, a complete container is provided of a specific selected internal volume.

The upper part 12 has a cylindrical neck portion 22 at its top. This neck portion may be extended by an extra cylindrical portion 24 which is slipped over the neck portion and sealed to it. There is an opening in the wall of the upper part to which a short neck 30 is sealed. The neck 30 contains a packing gland, into which is sealed a glass tube 32. Liquid placed in the container will rise also in the glass tube and the level of the liquid can be read against a scale 35 marked on a vertical plate 34 behind the glass tube 32.

The upper and lower parts are shown as hemispherical. This is for the purpose of providing a rigid surface that is least likely to change volume under outside forces or to form dents which can change the internal volume of the container. It is possible, however, to use other shapes, particularly conical shapes, which have substantially the same properties as the hemispherical shapes.

In the drawings no means are shown for supporting the container on legs. This, of course, can be done as is well known in the art. Special cylindrical receptacles, such as 19, can also be provided, which will support the container by means of the brackets such as 36A, etc.

One of the most important parts of the container lies in the manner of clamping the three parts together so that there is a tight metal to metal fit of the three parts, and a complete liquid seal at the joints between the top and middle parts and between the bottom and middle parts. Three embodiments of such clamping means are shown in FIGS. 2, 4 and 5.

Consider first FIG. 2. In this embodiment thin rings 42, 44 of metal are fastened to the outside of the upper and lower parts 12, 14, with their edges flush with the bottom edge 18 of the upper part and the top edge of the lower part of the container. The rings 42 and 44 must be sealed to the upper and lower parts. The central part comprises a ring 16 of the proper inner diameter so that the inner surface will be flush with the inner surfaces of the top and bottom parts. "O"-rings 46 are provided against which the rings 42 and 44 press and seal the joints.

A plurality of tabs or brackets 36, 37, 38 and 39, on the upper part and corresponding tabs or brackets 36A, 37A, 38A and 39A are provided on the lower part. These are to clamp against the upper edge of the ring 42 and the lower edge of the ring 44, to bring them close together so that the rings 42 and 44 will press and seal against the "O"-rings 46. The width 58 of the internal surface of the central part is of precise dimension, as is the internal diameter and other dimensions of the upper and lower parts of the container, so that the internal volume will be correct and constant. The outer portion of the ring 16 is of such dimension that there will be clearance between the tabs 37 and 37A, for example, as they are pulled together by means of screws 40, to clamp the upper and lower parts against the seal rings 46.

In FIG. 2 the seal rings 42 and 44 are themselves fastened to and sealed to the upper and lower parts respectively. They seal independently against "O"-rings which are inserted into the central part 16. All that is required is to press the three parts together. The tabs 37, 37A, for example, need not be fastened to the upper and lower parts but can be separated from them since they simply clamp against the rings 42 and 44. For example, conventional C-clamps or the like, could be used to hold these together. The tabs 37, etc. can, of course, be continuous rings.

FIG. 4 shows another embodiment in which the upper and lower parts are sealed independently, by means of "O"-rings, to the central part 50. Here the "O"-rings are inserted in an outer wall, so that they will seal against the outer surface of the upper and lower parts. In order to clamp the three parts together, the tabs 52, 52A, for example, must be fastened to the upper and lower hemispheres, such as by means of welding, 48, 48A, for example. When it is desired to change the volume of the container, screws 40 are removed and a central part 50 of longer axial dimension is inserted and the upper and lower parts again clamped and sealed to the central cylindrical part 50 as before.

FIG. 5 illustrates a third embodiment in which larger rings 54 and 54A are fastened and sealed to the upper and lower parts 12 and 14 respectivey, by means such as welds 60 and 60A. In this embodiment the central part 56 is of a simpler construction, which comprises a simple ring having parallel upper and lower faces, into which are inserted "O"-rings 46. To assemble the container the upper and lower parts are set on top of the central portion 56 and the bolts 40 are screwed tight so that the rings 54 and 54A will seal against the "O"-rings 46.

It will be clear that this embodiment of FIG. 5 requires a continuous ring around the bottom edge of the top part 12 and around the top edge of the bottom part 14, since the rings must be sealed to the top and bottom parts, so that they can themselves be sealed to the central part. In contrast, the embodiment of FIG. 4 can utilize simple tabs or brackets although it also can use a continuous ring which is tack welded to the outer surface of the upper and lower parts. In FIG. 2 the tabs or brackets are not necessarily fastened to the upper and lower portions but are used simply as clamps to hold the three parts together.

In FIG. 2 a lower hemispheere 14 is shown. In addition, other positions of the lower hemisphere are shown in dashed lines 14A and 14B. These would be the position of the bottom part with increasing thickness to the central part 16.

In order to preserve the dimensional stability of the containers they are usually constructed of stainless metal, or they can be enameled to prevent corrosion or they can be polished and maintained so as to be free of corrosion.

The figures illustrate the upper and lower parts being constructed in the form of hemispheres. It will be equally useful to use a conical shaped container which has comparable rigidity to the hemispherical shape. These are preferred to right circular cylindrical containers since there may be some flexibility in the plane bottom and top surfaces which could alter the internal colume of the container.

While the invention has been described with a certain degree of particularity it is manifest that many changes may be made in the details of construction and the arrangement of components. It is understood that the invention is not to be limited to the specific embodiments set forth herein by way of exemplification, but is to be limited only by the scope of appended claim or claims, including the full range of equivalency to which each step thereof is entitled.

What is claimed is:

1. A convertible measuring container comprising:
    a. an upper housing having the lower end thereof open;
    b. a lower housing having the upper end thereof open and the lower end thereof closed, the open upper end of said lower housing having an internal diameter substantially equal to the internal diameter of the lower open end of the upper housing:
    c. a central housing removably interposed between the upper and lower housings and having the opposite ends thereof open, said open ends of the central housing having an internal diameter substantially equal to the internal diameters of the open lower end of the upper housing and the open upper end of the lower housing, said central housing being interchangable with substantially identical central housings of varying lengths to selectively vary the overall volume of the container;
    d. fastening means provided at the joints between the central housing and the upper and lower housings for removably securing the central housing therebetween; and
    e. sealing means cooperating with the fastening means for precluding leakage of fluid between the central housing and the upper and lower housings.

2. The convertible measuring container as in claim 1 including:
    cylindrical tubular gauge means, and means to attach and seal said tubular means to said upper housing.

3. The convertible measuring container as in claim 1 wherein the central housing includes a plurality of different cylindrical housings each of different axial length.

4. The convertible measuring container as in claim 1 in which said upper housing includes a hemispherical section in open communication with the central housing, and said lower housing is of a hemispherical configuration.

5. The convertible measuring container as in claim 1 in which said upper and lower housings are sealed directly to said central housings.

6. The convertible measuring container as in claim 1 in which said upper and lower housings are attached and sealed to separate circular rings, and said rings are independently sealed to said central housing.

* * * * *